United States Patent [19]

Gelfand

[11] 3,910,995
[45] Oct. 7, 1975

[54] PROCESS FOR PREPARING 2,5-DIHALO-3-NITROBENZOIC ACID

[75] Inventor: Samuel Gelfand, Niagara Falls, N.Y.

[73] Assignee: Hooker Chemicals & Plastics Corporation, Niagara Falls, N.Y.

[22] Filed: Sept. 10, 1973

[21] Appl. No.: 395,681

[52] U.S. Cl. .......................... 260/515 A; 260/518 A
[51] Int. Cl.² ................................... C07C 79/46
[58] Field of Search ............................ 260/515 A

[56] References Cited
UNITED STATES PATENTS
3,397,229   8/1968   Welch .............................. 260/515
3,703,546   11/1972  Leaper et al ...................... 260/518

*Primary Examiner*—James A. Patten
*Attorney, Agent, or Firm*—Peter F. Casella

[57] ABSTRACT

A novel process for the preparation of 2,5-dihalo-3-nitro-benzoic acid and derivatives thereof is provided. The process comprises treating a compound of the formula

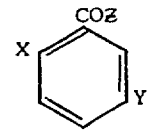

wherein X and Y are halogen, and Z is selected from the group consisting of halogen and anhydride, namely 2,5-dihalobenzoyloxy- without an intermediate hydrolysis step, with a sulfur-containing compound selected from the group of sulfur trioxide, oleum, chlorosulfonic acid and mixtures thereof and a nitrating agent to produce 2,5-dihalo-3-nitrobenzoic acid. The process gives an increased yield of the desired 3-nitro-isomer product thereby decreasing the amount of undesired by-product isomers.

10 Claims, No Drawings

PROCESS FOR PREPARING 2,5-DIHALO-3-NITROBENZOIC ACID

This invention relates to a novel process for the preparation of compounds of the formula

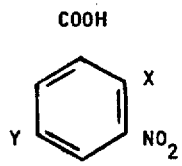

wherein X and Y are halogen.

Traditionally such compounds are prepared by nitrating a starting material of the formula

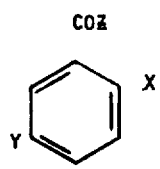

wherein X and Y are halogen, and Z is selected from the group consisting of halogen and anhydrides.

In such prior art processes an initial hydrolysis step is required before nitration. A customary method of hydrolyzing an acid halide is by treatment with sulfuric acid containing sufficient water to react with the acid chloride. However, this step also involves the undesired evolution of a halogen acid which continues through the subsequent nitration step. Evolution of the halogen acid results in loss of nitrating agent by being carried out of the reaction mixture with the halogen acid and generally makes the reaction difficult to carry out. After said hydrolysis step, nitration is carried out by the addition of a nitrating agent such as nitric acid to the slurry of the compound in the sulfuric acid.

In the prior art nitrations, a substantial portion of the product is comprised of the 6-nitro-isomer. In many processes it is desired that the product be comprised almost exclusively of the 3-nitro- isomer, and the formation therein of a large amount of 6-nitro- isomer is undesirable. In contrast, the process of the present invention provides a process wherein the formation of 6-nitro- isomer is minimized.

The process of the present invention produces a 3-nitro- isomer product in unexpected high yield without a hydrolysis step.

In accordance with this invention, there is provided a process for the preparation of a compound of the formula

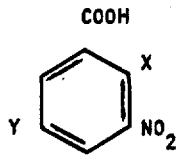

wherein X and Y are selected from the group consisting of fluorine, chlorine, bromine and mixtures thereof, comprising subjecting a compound of the formula

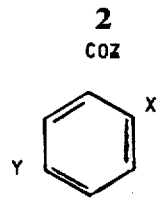

wherein X and Y are as hereinbefore described, and Z is selected from the group consisting of fluorine, chlorine, bromine, mixtures thereof and anhydride, namely 2,5 dihalobenzoyloxy-.

The above starting compounds may be directly nitrated using a mixture of a substantially anhydrous sulfur-containing compound selected from the group of sulfur trioxide, oleum, chlorosulfonic acid and mixtures thereof with a nitrating agent, such as nitric acid, commercial mixed acids (which are comprised of nitric acid and sulfuric acid) and other nitrating agents known to the art as metal nitrates.

It is known that the mixture of nitric acid and oleum is an extremely powerful nitrating medium, but that the use thereof may result in some undesired sulfonation reactions. It has been discovered however, that not only is said medium, a very effective, but that use thereof in the nitration of certain benzoic acid/derivatives without a hydrolysis step, will increase the yield of the desired 3-nitro- isomer thereby reducing the yield of undesired isomers. This phenomenon is unexpected, the mechanism heretofore unknown.

In the process of this invention, the organic compound to be nitrated is added to the oleum and nitration is carried out in the mixture. The useful weight/weight ratio of oleum to starting material is from about 2/1 to about 6/1, though it is preferred to have said ratio be from about 2/1 to about 4/1.

The oleum may be at a concentration of from about 10 to about 65 percent by weight, although it is preferred to use a concentration of from about 20 to about 40 percent, and it is apt to use a concentration of from about 20 to about 30 percent.

Other anhydrous sulfur-containing compounds such as sulfur trioxide or chlorosulfonic acid in comparable ranges and concentrations may be utilized. In most instances the starting material is preferably added to the sulfur-containing material prior to addition of the nitrating agent.

The rate of nitration is relatively fast. The reaction is exothermic and the rate of addition will be a function of the measures taken to maintain the desired reaction temperature by removal of heat.

In the prior art method, which utilizes concentrated sulfuric acid, hydrogen halide was evolved when the reactant to be nitrated had an acid halide group on the ring and was added to the sulfuric acid. Thus, for example, hydrogen chloride was evolved in the nitration of 2,5-dichlorobenzoyl chloride when 99 percent sulfuric acid was added thereto. This phenomenon, unexpectedly, does not occur in the process of the present invention nor is any hydrogen chloride evolved during the nitration or product recovery steps.

The concentration of the nitrating agent is not critical; as long as sufficient nitronium ions are provided.

The amount of nitrating agent employed may be varied from the theoretical amount to effect complete nitration to a substantial excess. Generally it is preferred to use a small, e.g. 5 to 20%, in excess of theoretical.

Nitric acid and mixed acid are a preferred nitrating agent. It is preferred that more than the stoichiometric amount thereof be used: approximately about 1.05 to about 1.20 moles of nitric acid per mole of the compound to be nitrated should be used. The term mixed acid is a term of the art and as used herein means any mixture of sulfuric and nitric acids that may be useful in nitration reactions. Mixed acid is also called nitrating acid. Usually the concentration of nitric acid in mixed acid is between about 30–45% by weight.

During the nitration the reaction temperature should be maintained between about −5° to about 70° centigrade, though it is suitable to utilize at a temperature of from about 25° to about 60° centigrade, and it is preferred to utilize a temperature of from about 35 to about 55 degrees centigrade. It has been discovered that, when the process of this invention is practiced within said temperature ranges, no sulfonation reactions occur.

The nitration reaction will take from about 1 to about 12 hours, depending upon the nature of the compound to be nitrated, nitration temperature and the concentration of the nitrating agent. It is preferred, however, to have a reaction time of from about 1 to about 4 hours.

Suitable starting materials for the present invention include, e.g.

2,5-dichlorobenzoic anhydride
2.5-dichlorobenzoyl chloride
2,5-dichlorobenzoyl fluoride
2,5-dichlorobenzoyl bromide
2-chloro-5-bromobenzoyl chloride
2-bromo-5-chlorobenzoyl chloride
2,5-dibromobenzoyl chloride
2-fluoro-5-chlorobenzoyl chloride
2-fluoro-5-bromobenzoyl chloride
2,5-difluorobenzoyl chloride
2-chloro-5-fluorobenzoyl chloride
2-bromo-5-fluorobenzoyl chloride When 2,5-dichlorobenzoyl chloride, is nitrated with 96.99 percent sulfuric acid and nitric acid in the usual manner, only about 60 percent of the resulting product is comprised of the desired 3-nitro- isomer. When 2,5-dichlorobenzoyl chloride is treated by the process of this invention, up to about 80 percent of the resulting product is comprised of the desired 3-nitro- isomer. Furthermore the process of this invention facilitates the separation of the 3-nitro- and 6-nitro- isomers inasmuch as the isomer to be removed is present in lower concentration in thê mixture and less of the desired isomer is lost in the separation of isomers. Various means may be used to separate the isomers. This separation may be effected by washing out the 6-nitro- isomers. This separation may be effected by washing out the 6-nitro- isomer with a suitable organic solvent or recrystallizing the product from the solvent. Suitable solvents are such as toluene, chlorobenzene, dichlorobenzene, trichlorobenzene, etc. Other methods by washing the product with water, by pH separation methods and by solubilization of the 6-nitro- isomer in aqueous sulfuric acid. Separation can also be accomplished by fractional distillation of the esters.

In the practice of the process of the present invention yields range from about 90 to about 100 percent may be obtained. When the preferred reaction conditions are used the yields are generally 95-100 percent.

The nitrated compound formed by the process of this invention may subsequently be reduced to the corresponding amino compound. Thus, e.g., 3-nitro-2,5-dichlorobenzoic acid may be reduced to 3-amino-2,5-dichlorobenzoic acid, the latter compound being a commercial herbicide. Said reduction may be effected by chemical means utilizing tin and hydrochloric acid or iron and water or with other catalysts such as Raney nickel, platinum oxide or platinum on carbon. Chemical reduction may be carried out in an aqueous or hydrochloric acid solution or suspension at 50°–100°C. Catalytic reduction with hydrogen and catalyst may be carried out in solution such as in methanol or ethanol or on a salt such as the sodium or ammonium salt in aqueous solution.

The following examples are presented to illustrate the most preferred embodiments of my invention, and are not to be deemed limitative thereof. Unless otherwise stated, parts are by weight and temperatures are in degrees centigrade.

Unless otherwise described all experiments were carried out in a 250 ml. 3 necked flask equipped with a dropping funnel, stirrer, thermometer and condenser. The sulfuric acid, oleum or sulfur trioxide reaction medium was charged to the reaction flash and the material to be nitrated was added with stirring while maintaining the reaction vessel at 25°–40°C. The nitrating agent was added dropwise with stirring while maintaining the desired reaction temperature. After completion of the addition (15–45 minutes addition time) the reaction mixture was stirred and maintained at the reaction temperature for the stated time. Reaction mixtures were worked up by pouring on ice, filtering, washing twice by slurrying with water, filtering and drying with steam heat at water pump vacuum. Samples of the product were converted to the methyl esters by reaction with diazomethane and analyzed by gas chromatography.

EXAMPLE 1

2,5-dichlorobenzoic anhydride was prepared by heating and stirring a mixture of 24g. (1/8 mole) of 2,5-dichlorobenzoic acid and 26g. (1/8 mole) of 2,5-dichlorobenzoyl chloride until the evolution of hydrogen chloride ceased. After the addition of 125 grams of 20% oleum nitration was carried out with 45g. (28% excess of mixed acid for 4 hours at 40°–45°C. The product was obtained in 97.4% yield.

| Analysis: | |
|---|---|
| 2,5-dichlorobenzoic acid | 1.3% |
| 2,5-dichloro-3-nitrobenzoic acid | 75% |
| 2,5-dichloro-6-nitrobenzoic acid | 22% |

The yield of 2,5-dichloro-3-nitrobenzoic acid adjusted for recovered starting material was 76%.

EXAMPLE 2

2,5 -dichlorobenzoyl chloride 52.4g. (1/4 mole) was added to 100 grams of stabilized sulfur trioxide (Sulfan B) with cooling in an ice bath to maintain the temperature at 22°–24°C during the addition. Mixed acid 37g. (5% excess) was added and the temperature was maintained at 25°–35°C for 4 hours. Substantially no hydrogen chloride was evovled during the course of the addition or nitration steps. Workup of the reaction mixture gave a theoretical yield of product with the following analysis.

| | |
|---|---|
| 2,5-dichlorobenzoic acid | 14.3% |
| 2,5-dichloro-3-nitrobenzoic acid | 69.7% |
| 2,5-dichloro-6-nitrobenzoic acid | 13.0% |

The yield of 2,5-dichloro-3-nitrobenzoic acid adjusted for recovered starting material was 81.3%.

EXAMPLE 3

2,5-dichlorobenzoyl chloride 52.4g (¼ mole) was added to a mixture of sulfur trioxide 60g (0.75 mole) and chlorosulfonic acid 58g. (0.5 mole) at 22°C. After nitration with mixed acid 39g. (10% excess) for 4 hours, at 35°–40°C, the product was obtained in near theoretical yield.

| Analysis: | |
|---|---|
| 2,5-dichlorobenzoic acid | 0.9% |
| 2,5-dichloro-3-nitrobenzoic acid | 75.3% |
| 2,5-dichloro-6-nitrobenzoic acid | 21.1% |

EXAMPLE 4

2,5-dichlorobenzoyl chloride 52.4g. (¼ mole) in 175 grams of 46% oleum was nitrated with 42g. (20% excess) of mixed acid for 4 hours at 40°C. The product obtained in 96.6% yield had the following analysis:

| | |
|---|---|
| 2,5-dichlorobenzoic acid | 1.5% |
| 2,5-dichloro-3-nitrobenzoic acid | 78.4% |
| 2,5-dichloro-6-nitrobenzoic acid | 18.9% |

EXAMPLE 5

2,5-dichlorobenzoyl chloride 52.4g. (¼ mole) in 125g. of 20% oleum was nitrated with 42 grams of mixed acid (20% excess) for 8 hours, at 40°C. A 76.6% yield of product was obtained having the following analysis.

| | |
|---|---|
| 2,5-dichlorobenzoic acid | 1.3% |
| 2,5-dichloro-3-nitrobenzoic acid | 94.6% |
| 2,5-dichloro-6-nitrobenzoic acid | 2.0% |

EXAMPLE 6

2,5-dichlorobenzoyl chloride 52.4g. (¼ mole) in 126g. 30% oleum was nitrated with 20 grams of commercial 90% nitric acid (14% excess) for 4 hours at 40°C. The 2,5-dichloronitrobenzoic acid was obtained in 45.5g. (77.1%) yield.

| Analysis: | |
|---|---|
| 2,5-dichlorobenzoic acid | 0.4% |
| 2,5-dichloro-3-nitrobenzoic acid | 95.4% |
| 2,5-dichloro-6-nitrobenzoic acid | 2.6% |

EXAMPLE 7

2,5-dichlorobenzoyl chloride 52.4g. (¼ mole) in 145 grams 30% oleum was nitrated for 4 hours at 55°–60°C. with 20g. (14% excess) of 90% nitric acid. The product obtained in 71.8% yield analyzed as follows:

| | |
|---|---|
| 2,5-dichlorobenzoic acid | 0.8% |
| 2,5-dichloro-3-nitrobenzoic acid | 95.4% |
| 2,5-dichloro-6-nitrobenzoic acid | 2.1% |

What is claimed is:

1. A process of preparing 2,5-dihalo-3-nitro benzoic acid and derivatives thereof which comprises the steps of reacting a compound of the formula

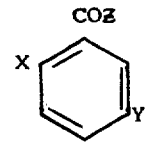

wherein X and Y are hologen and Z is selected from the group consisting of halogen and anhydride, namely 2,5 dihalobenzoyloxy-, without an intermediate hydrolysis step, with a sulfur-containing compound selected from the group consisting of sulfur trioxide, oleum, chlorosulfonic acid and mixtures thereof and a nitrating agent.

2. The process of claim 1 wherein Z is chlorine.

3. The process of claim 2 wherein X and Y are chlorine.

4. The process of claim 1 wherein Z is anhydride, namely 2,5 dihalobenzoyloxy-.

5. The process of claim 4 wherein X and Y are chlorine.

6. The process of claim 1 wherein the nitrating agent is mixed acid.

7. The process of claim 1 wherein the sulfur-containing compound is oleum.

8. A process of preparing 2,5 -dichloro-3-nitro benzoic acid comprising the steps of reacting 2,5 dichlorobenzoyl chloride, without an intermediate hydrolysis step with a sulfur-containing compound selected from the group consisting of sulfur trioxide, oleum, chlorosulfonic acid and mixtures thereof and a nitrating agent.

9. The process of claim 8 wherein the sulfur-containing compound is oleum.

10. The process of claim 8 wherein the nitrating agent is mixed acid.

* * * * *